United States Patent [19]
House

[11] Patent Number: 5,006,000
[45] Date of Patent: Apr. 9, 1991

[54] EDUCATIONAL AID WITH SUBSTITUTABLE MAGNETIC ITEMS

[76] Inventor: Charles E. House, 5055 Beatrice Way, Columbia, Md. 21044

[21] Appl. No.: 469,041

[22] Filed: Jan. 23, 1990

[51] Int. Cl.⁵ .................................................. G09B 1/00
[52] U.S. Cl. ...................................... 434/161; 434/409; 434/168
[58] Field of Search ............... 434/168, 161, 159, 301, 434/409, 330; 446/131, 132, 133, 134, 135

[56] References Cited

U.S. PATENT DOCUMENTS

| | | | |
|---|---|---|---|
| 417,931 | 12/1889 | Miatt | 446/132 |
| 2,524,804 | 10/1950 | Irby | 434/301 |
| 2,530,013 | 11/1950 | Hanback | 446/131 |
| 3,013,206 | 12/1961 | Youngquist et al. | 434/409 X |
| 3,432,941 | 3/1969 | Minchom | 434/301 |
| 3,585,735 | 6/1971 | Miller | 434/409 |
| 3,662,477 | 5/1972 | Weinstein | 35/9 R |
| 4,451,985 | 6/1984 | Pullman | 434/409 X |
| 4,804,327 | 2/1989 | Miller | 434/409 |

FOREIGN PATENT DOCUMENTS 644912  9/1962  Italy ..................................... 446/134

Primary Examiner—Richard J. Apley
Assistant Examiner—Rachel M. Healey
Attorney, Agent, or Firm—Joseph Scafetta, Jr.

[57] ABSTRACT

An educational and entertaining device stimulates learning, creativity, imagination, and artistic interpretation. The principal elements in the device are flexible magnetic character pieces and geometrically shaped metallic chips which, when magnetized, form solid replicas in the shape of the flexible magnetic character pieces. The invention is activated by placing a preformed, flexible magnetic alphabet letter, numeral, animal or other character piece on an image board located in a bottom half of the device. Alternatively, separate magnetic character pieces may also be placed on the image board to form a series of artistic impressions. Once the device is closed and secured, the user shakes the device, thus causing the geometrically shaped metallic chips to form an impressionistic picture. All of the alphabet letters, numerals, animals, and other artistic shapes may be created by repeating the process with different flexible magnetic character pieces.

7 Claims, 3 Drawing Sheets

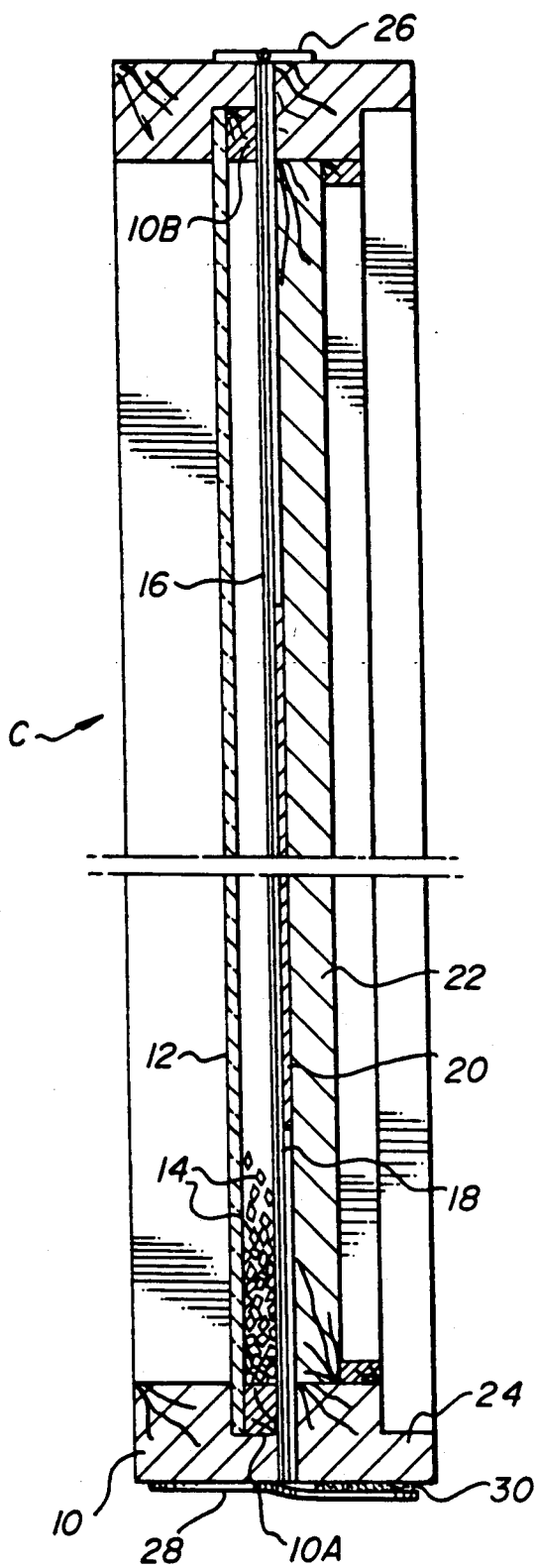
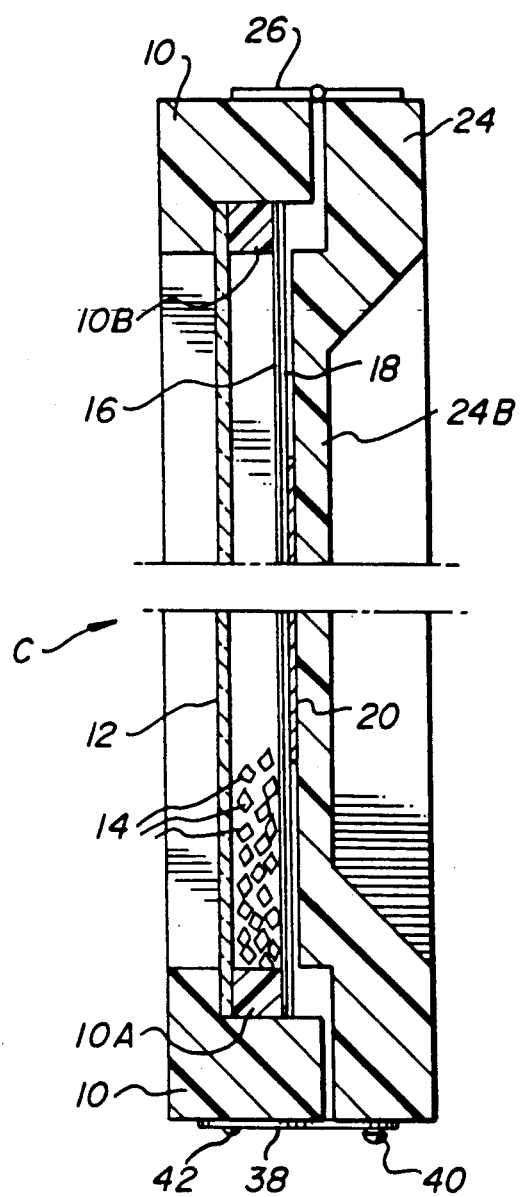
Fig. 6
Fig. 7

EDUCATIONAL AID WITH SUBSTITUTABLE MAGNETIC ITEMS

BACKGROUND OF THE INVENTION

1. Field of the Invention

This invention relates generally to education and, in particular, to an educational aid with substituable magnetic items for teaching children to recognize characters.

2. Description of the Related Art

Teaching children, particularly of pre-school age, is a difficult and demanding job for many reasons, including the fact that they have a short attention span. Accordingly, it is often necessary for teachers and day-care counselors to resort to various "gimmicks" to capture and retain the attention of children. One such gimmick is the appearance of "magic" tricks using magnets and the like.

An educational aid using magnets is exemplified by the device disclosed in U.S. Pat. No. 3,662,477 which issued to Weinstein on May 16, 1972. However, the educational aid of Weinstein is complicated and difficult for a child to use.

Toys using magnets were developed earlier and were simpler to use. However, they had limited educational value. Such magnetic toys are typified by the device disclosed in Italian Pat. No. 644,912 which issued to Pollato on Sept. 10, 1962, and in U.S. Pat. No. 417,931 which issued to Miatt on Dec. 24, 1889.

Therefore, it remains a problem to develop an attention-getting device of some educational value for children who can be easily taught either by a teacher, by a day-care counselor, or by the children themselves.

SUMMARY OF THE INVENTION

It is a primary object of the present invention to have an educational aid for use in teaching children, both at the pre-school and the early school-age levels, to recognize the letters of the alphabet, mathematical numerals, a variety of animals, and other common objects.

It is another object of the invention to develop an educational aid that is portable, easy to operate, and fun to use.

It is a further object of the invention to have a simply constructed educational aid that stimulates the artistic imagination of the children being taught as images are being formed and dissolved by metallic chips moved by magnets confined within a frame.

Essentially, the invention may be summarized as an educational aid in the shape of a picture frame having a plurality of substitutable magnetic items. The frame is hinged and may be opened so that one or more magnetic items may be placed in a holding space. When the frame is closed and latched shut, a selected item is retained behind an opaque protective sheet. Metallic chips or powder are confined in the frame in front of the protective sheet, but behind a transparent front film cover. When the metallic chips are swirled around by a teacher or a day-care counselor, they are held in positions predetermined by the selected magnetic items behind the protective sheet. When the teacher or day-care counselor holds up the image formed in the picture frame, the children are asked if they recognize the image, which may be of a letter, a number, an animal, or the like.

These and other objects of the present invention will become more readily understood from an examination of the following brief description of the drawings and the subsequent detailed description of the two preferred embodiments.

BRIEF DESCRIPTION OF THE DRAWINGS

FIG. 6 is a cross-sectional view taken along line 6—6 in FIG. 5.

FIG. 7 is a cross-sectional view of a second embodiment of the present invention.

DETAILED DESCRIPTION OF THE PREFERRED EMBODIMENTS

Figure 1:
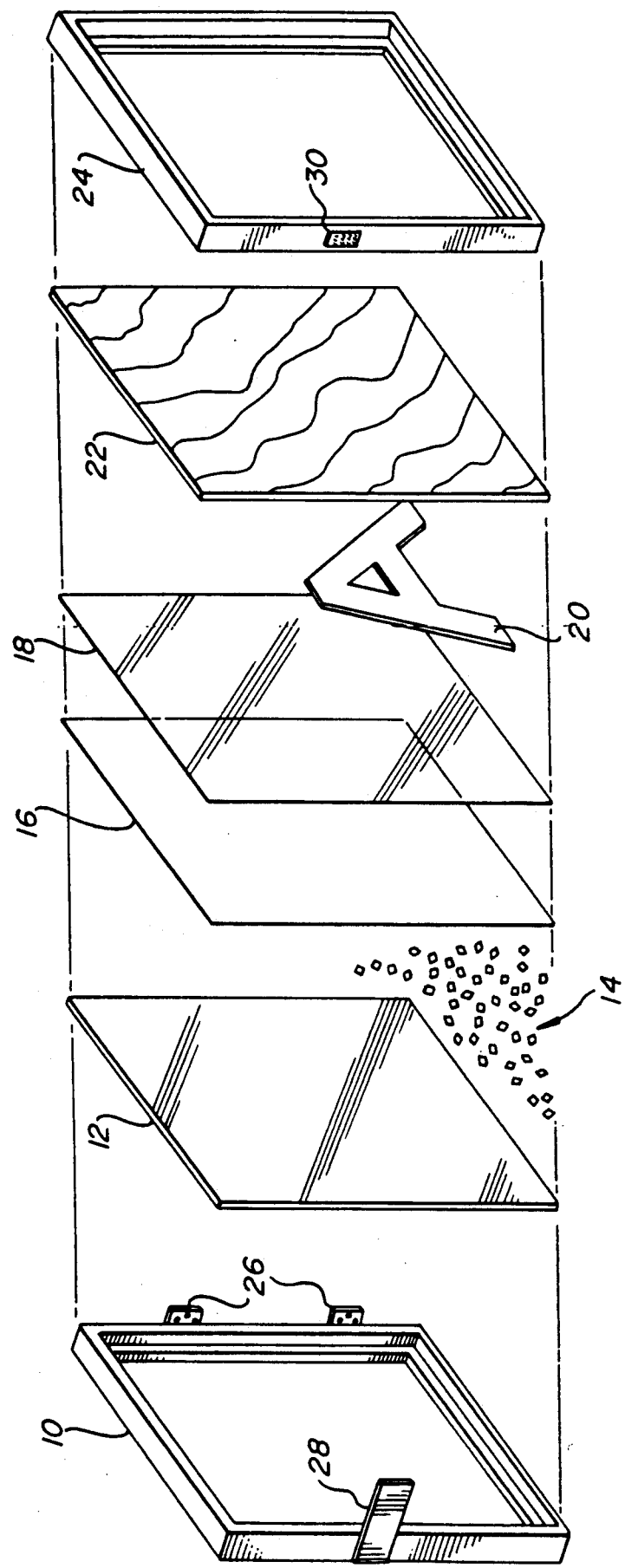
FIG. 1 is an exploded perspective view of a first embodiment of the present invention.

In FIG. 1, there is illustrated an exploded perspective view of a first embodiment of the educational aid in its entirety. From left to right, there is shown a first or top part 10 of a frame, a clear plastic film 12, a plurality of magnetizable metallic chips 14, a colored paper sheet 16, a protective plastic sheet 18, a substitutable magnetic item 20 which in this case is the capital letter "A", a backing plate or board 22, and a second or bottom part 24 of the frame.

On the first part 10 of the frame, there is a pair of hinges 26 on one side and a VELCRO strip 28 on the other side thereof. The hinges 26 are fastened to one side of the second part 24 of the frame. Likewise, the strip 28 is fastened to the other side of the second part 24 of the frame by a patch 30 of VELCRO material.

In regard to the magnetic item 20, it is preformed by either cutting or stamping a flexible thin sheet of magnetic plastic into the desired shape of either one of the 26 letters of the alphabet or one of the ten arabic numerals. These 36 characters are supplied with each educational aid to make a standard kit. Furthermore, other magnetic items 20, preformed in the shape of well-known domestic animals and common household objects, may also be supplied with each educational aid in a larger kit, depending upon the age group of the children to be taught.

Figure 2:
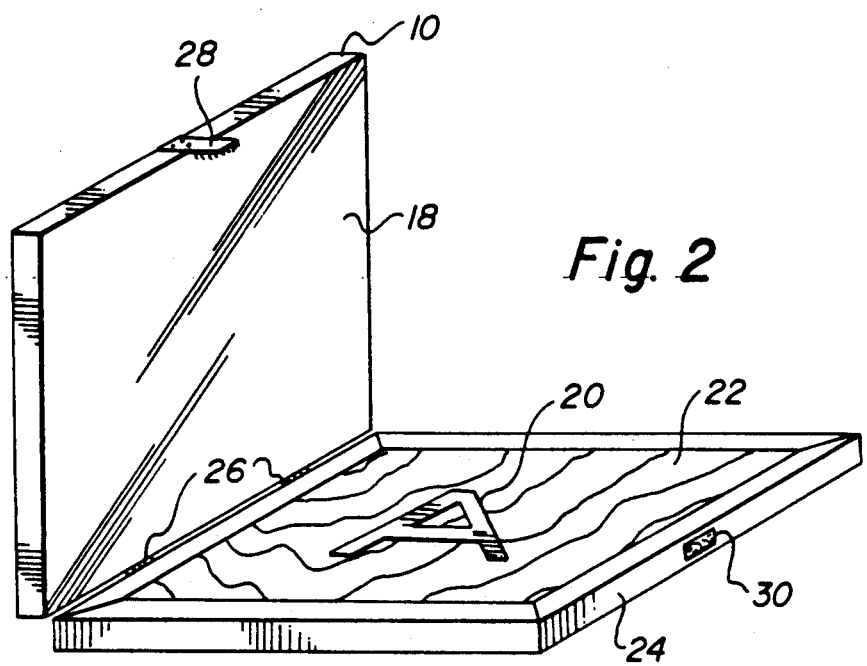
FIG. 2 is a perspective view of the first embodiment in an opened position.

In FIG. 2, the first part 10 of the frame has been joined to the second part 24 by fastening the pair of hinges 26 along one side of the two parts 10 and 24 of the frame. The educational aid is shown in its open position with the flat magnetic item 20 resting in place on the backing plate or board 22. The protective plastic sheet 18 is shown on the underside of the first part 10 of the frame. The strip 28 with hooks extending therefrom is secured on the side opposite from the hinges 26 and is ready to engage the patch 30 on the same side of the second part 24 of the frame.

Figure 3:
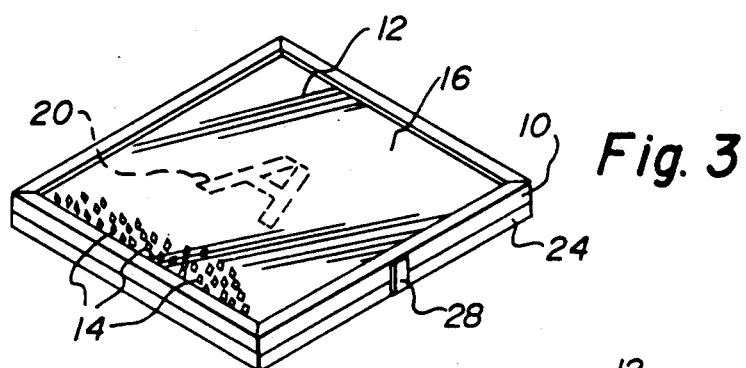
FIG. 3 is a perspective view of the first embodiment in a closed position.

In FIG. 3, all elements shown in FIG. 1 have been collapsed together and the open educational aid seen in FIG. 2 has been closed and fastened shut by the strip 28 which extends across the sides of both the first part 10 and the second part 24 of the frame. Through the clear plastic film 12 which serves as a front cover, the metallic chips 14 are visible and confined thereunder on a top surface of the colored paper sheet 16 that serves as a background. Underneath the colored paper sheet 16, there is concealed the protective plastic sheet 18 (not shown in FIG. 3, but see FIG. 2) and the magnetic item 20 illustrated in phantom lines only.

Figure 4:
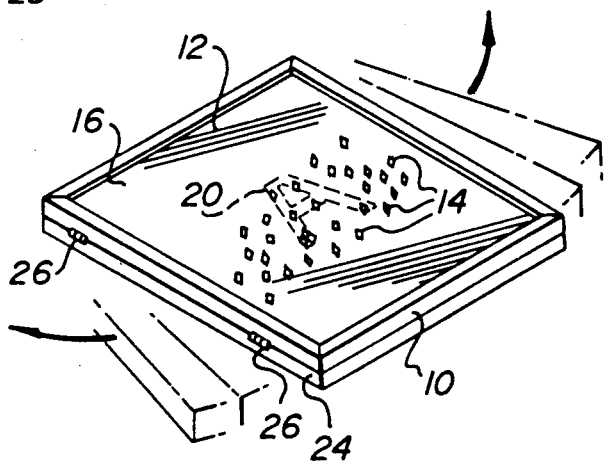
FIG. 4 is a perspective view of the first embodiment in use.

In FIG. 4, the educational aid closed by the hinges 26 is shown to be shaken and tilted. These movements are indicated by the directional arrows and the phantom lines for the first part or the top half 10 and the second part or the bottom half 24 of the frame. As the frame is shaken and tilted by either the teacher or the day-care counselor or the child, the metallic chips 14 move in a first enclosed space defined by inner sides 10A and 10B (see FIG. 6) of the first part 10 of the frame, the clear stiff plastic film 12 which serves as a front cover, and the colored paper sheet 16 which serves as a bottom for the holding area or the first space.

The metallic chips 14 may be cut into different geometrical shapes, such as triangles, diamonds, and the like, so as to add unique highlights to the image formed whenever either natural sunlight or artificial light is reflected therefrom.

Figure 5:
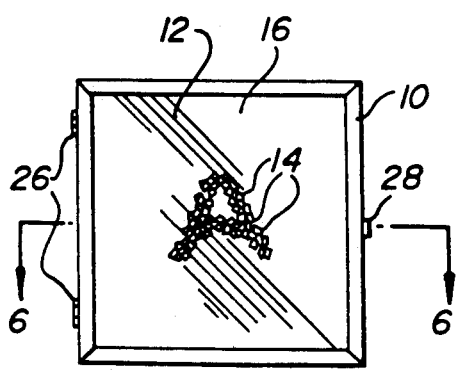
FIG. 5 is a top plan view of the first embodiment of the present invention.

In FIG. 5, the plurality of metallic chips 14 has been captured and assembled under the front plastic film 12 and on top of the bottom colored paper sheet 16 by a strong magnetic field emitted by the concealed item 20 that is retained between the protective plastic sheet 18 (not shown in FIG. 5, but see FIG. 2) and the backing plate or board 22 (also not shown in FIG. 5, but likewise see FIG. 2).

As shown in FIG. 6, because the distance in a second space between the protective plastic sheet 18 and the backing plate or board 22 is slightly less than the thickness of each magnetic item 20, pressure sufficient to retain the selected magnetic item 20 is exerted by the hinges 26, in conjunction with the strip 28 and the patch 30, when the first part 10 and the second part 24 of the frame are closed tightly together.

In the cross-sectional view of FIG. 6, the holding area for the plurality of metallic chips 14 is also seen as defined by inner sides 10A and 10B of the first part 10 of a wooden frame, the front plastic film 12, and the colored paper sheet 16.

The protective plastic sheet 18 that underlays the colored paper sheet 16 has been included in FIG. 6 and can be viewed by a child looking in the direction of an arrow C.

A modification of the first embodiment in FIG. 6 would be that the colored paper sheet 16 is deliberately omitted. However, this modification is not acceptable because the advantage of having selectable background colors is lost by omitting the colored paper sheet 16.

In FIG. 7, a second embodiment of the educational aid is illustrated. There are some refinements in this second embodiment. First, the first part or top half 10 and the second part or bottom half 24 of the frame are both made of lightweight plastic. Second, the strip 28 and the patch 30 of the first embodiment shown in FIG. 6 are replaced by a metallic hook 38 and a first screw 40. Generally, the strip 28 of FIG. 6 and the hook 38 of FIG. 7 serve as latches while the patch 30 of FIG. 6 and the screw 40 of FIG. 7 serve as keepers. A second screw 42 fastens the hook 38 to the first part 10 of the frame.

As shown in FIG. 7, the first part 10 and the second part 24 of the frame are fastened together at one side by hinges 26, in a manner identical to the first embodiment illustrated in FIG. 6.

Also, as shown in FIG. 7, the child views the educational aid in the direction of the arrow C and sees the front plastic film 12 and the plurality of metallic chips 14 confined therebehind in the first space defined by the film 12, the inner sides 10A and 10B of the first part 10 of the frame, and the colored paper sheet 16. The child would not see the protective plastic sheet 18 behind the colored paper sheet 16 in the second embodiment of FIG. 7. The magnetic item 20 is concealed from the child's view behind the opaque plastic sheet 18, but the presence of the item 20 is known from the magnetic field emitted thereby and the effect of this magnetic field on the plurality of metallic chips 14.

Another modification in the second embodiment of FIG. 7 is that the backing plate or board 22 is replaced by an indented backing section 24B which is formed by molding a plastic backing plate with the second part 24 of the frame into a unitized construction.

There are other modifications which may be made. For example, the thin stiff plastic film 12 on the front of the educational aid may be replaced by a clear rigid glass plate. However, this particular modification is not preferred because of the danger of injury to the child in the event that the educational aid is dropped and the glass plate breaks.

An example of another modification is that magnetizable powder may be substituted for the plurality of metallic chips 14. However, this modification is also not preferred because the powder is dirty and messy. Furthermore, the powder is lost over time as the educational aid is repeatedly used and reused. The preferred metallic chips 14 are neither dirty nor messy and are more likely to be found in the event of spillage from the educational aid.

In review, the invention and its operation may be described as follows. The frame of the educational aid is composed of two separate parts, i.e., the first part 10 and the second part 24, fastened together by the hinges 26 along one side thereof. The hinges 26 facilitate separation of the two parts 10 and 24 by allowing a user to lift the frame at the unhinged opposite side, when in an unlatched condition, to reveal the existence of the top half 10 and the bottom half 24, as best shown in FIG. 2.

The two parts comprising the frame have been discussed as the top half 10 and the bottom half 24 while the educational aid has been described as it would be used in a horizontally oriented position with the hinges 26 along the vertical side thereof. See FIGS. 1 and 5-7.

However, it should be understood that the two parts comprising the frame may also be discussed as the front half 10 and the rear half 24 while the educational aid may be described as it would be used in an upright or a vertically oriented position with the hinges 26 along either the top edge or the bottom edge of the frame. Each part 10 and 24 of the frame has a different function and is complete within itself, i.e., each may be manufactured separately.

The first part 10 of the frame contains the clear plastic safety film 12 that permits both the child and the teacher to view the image formed thereunder by the plurality of metallic chips 14 which may have different geometrical shapes that are assembled by the magnetic field emanating from a selected underlying item 20. The colored paper sheet 16 serves as a background on which the metallic chips 14 move. The plastic sheet 18 provides a protective backing for the colored paper sheet 16 against damage while assisting in the retention of the magnetic item 20 when the two parts 10 and 24 of the frame are closed tightly together. The first part 10 of the frame, the plastic film 12, the plurality of metallic chips 14, the colored paper sheet 16, and the protective plastic sheet 18 are preassembled together and sealed as a single unit which requires no further adjustments, alterations, or preparations by either the teacher, the day-care counselor, or the child.

The second part 24 of the frame contains a flat and smooth but hard backing plate or board 22 upon which one of a plurality of magnetic items 20 is selected and placed. If a backing plate is used, the plate may be either metal or plastic. However, if the board 22 seen in FIGS. 1, 2 and 6 is used, then the board 22 is made of wood. Similar to the first part 10 of the frame and its associated elements, the second part 24 of the frame is assembled together with its sole associated element, i.e., the backing plate or board 22, so that the second part 24 of the frame and the board 22 are completely self-contained as a second unit of the educational aid.

As in the case of the first unit comprising the top half 10 of the frame and its associated elements, the bottom half 24 of the frame and the backing plate or board 22 are preassembled and sealed as a single second unit which requires no further adjustments, alterations, or preparations by either the teacher, the day-care counselor, or the child.

In order to operate this invention, the user takes the closed educational aid shown in FIG. 3, unfastens the strip 28 from the patch 30 (not seen) on one side edge of the frame, and separates the top half 10 from the bottom half 24 by swinging the top half 10 around the hinges 26 so that the educational aid is in the open condition illustrated in FIG. 2. Next, the user selects one of the preformed flat magnetic items 20, which may be either a letter, a numeral, an animal, or another object, and places the item 20 on the top surface of the backing plate or board 22. Then, the top half 10 is swung about the hinges 26 until the protective plastic sheet 18 presses against the magnetic item 20. Thereafter, the user attaches the strip 28 to the patch 30 in order to fasten the top half 10 securely to the bottom half 24 of the frame with the magnetic item 20 firmly retained by friction between the first unit and the second unit.

As shown in FIG. 4, the user either tilts the educational aid from side to side or moves the aid in a circular motion so that the metallic chips 14 are swirled and marshalled by the magnetic field emanating from the item 20 concealed beneath the colored paper sheet 16 until an image is formed under the plastic film 12 in the shape of the concealed item 20. Finally, either the teacher asks the school-age children or the day-care counselor asks the preschool children the name of the image formed.

After the children make a correct identification, the user may repeat the procedure by separating the strip 28 from the patch 30, opening up the educational aid by swinging the first part 10 about the second part 24, and secretly replacing the first selected magnetic item 20 with a different item 20. After closing the educational aid and fastening the first part 10 to the second part 24, the user again shakes the aid, as shown in FIG. 4, and asks the children to identify the second image formed by the plurality of metallic chips 14 acting under the influence of the magnetic field emanating from the second concealed item 20.

This educational aid can be used effectively by either the teacher or the day-care counselor for instructing groups of children or by the child for self-instruction. When used by the child, the ability to recognize characters is enhanced in two ways: first, by selecting and handling the magnetic items 20; and second, by observing the swirling metallic chips 14 as they are arranged by the strong magnetic field into an image predetermined by the form of the selected item 20.

The foregoing two preferred embodiments are considered illustrative only. Numerous other modifications will readily occur to those persons skilled in making teacher's aids after reading this specification. Consequently, the disclosed invention is not limited by the exact construction and operation shown and described above but rather is defined by the claims below.

What I claim as my invention is as follows:

1. An educational aid, comprising:
   a. a frame having a first part and a second part;
   b. a clear front means, mounted in the first part of the frame, for viewing an image formed therebehind;
   c. a protective plastic sheet spaced behind the clear front means in the first part of the frame;
   d. a plurality of magnetizable means, restricted within a first space defined between the clear front means and the protective plastic sheet, for forming the image in the first space;
   e. backing means, arranged in the second part of the frame and spaced behind the protective plastic sheet in the first part of the frame, for defining a second space with the protective plastic sheet; and
   f. a colored paper sheet means, arranged in the first space between the clear front means and the protective plastic sheet, for serving as a selectable background on which the plurality of magnetizable means form the image in the first part of the frame;
   g. substitutable magnetic means, having a preformed shape and being confinable within the second space between the protective plastic sheet and the backing means, for emanating a magnetic field that forms the plurality of magnetizable means into the image which is defined by the preformed shape.

2. The educational aid, according to claim 1, further comprising:
   g. hinge means, mounted on the frame, for allowing the first part of the frame to swing relatively about the second part of the frame.

3. The educational aid, according to claim 1, further comprising:
   h. latch means, secured to the first part of the frame, for fastening the first part to the second part of the frame; and
   i. means, secured to the second part of the frame, for keeping the latch means fastened to the second part of the frame.

4. An educational aid, comprising:
   a. a first frame means;
   b. a protective plastic sheet arranged in the first frame means;
   c. a plurality of magnetizable means, being movable in a first confined space on the protective plastic sheet, for forming an image in the first frame means;
   d. a second frame means, fastened to the first frame means, for defining underneath the protective plastic sheet a second confined space from which a magnetic field emanates so that the plurality of magnetizable means are moved in the first confined space on the protective plastic sheet to form the image;
   e. a colored paper sheet means, arranged on top of the protective plastic sheet, for serving as a selectable background on which the magnetizable means are moved to form the image;

f. clear means, being mounted in the first frame means and being spaced in front of the colored paper sheet means, for allowing a user to view the image formed in the first confined space on the colored paper sheet means;

g. substitutable means, having a preformed shape and being held within the second confined space, for emanating the magnetic field that moves the plurality of magnetizable means in the first confined space on the colored paper sheet means to form the image into the preformed shape; and h. backing means, arranged in the second frame means and spaced behind the protective plastic sheet in the first frame means, for defining second space with the protective plastic sheet.

5. The educational aid, according to claim 4, further comprising:

i. hinge means, mounted on both the first frame means and the second frame means, for allowing the first frame means to swing relatively about the second frame means.

6. The educational aid, according to claim 4, further comprising:

i. latch means, secured to the first frame means, for fastening the first frame means to the second frame means; and j. means, secured to the second frame means, for keeping the latch means fastened to the second frame means.

7. An educational aid, comprising:

a. a first frame part;

b. clear front means, mounted in the first frame part, for allowing a user to view an image formed therebehind;

c. protective plastic sheet means, spaced behind the clear front means, for forming a first confined space with the clear front means;

d. a plurality of magnetizable means, restricted to movement within the first confined space, for forming the image therein;

e. colored paper sheet means, arranged on top of the protective plastic sheet means, for serving as a selectable background on which the plurality of magnetizable means forms the image;

f. a second frame part;

g. backing means, arranged in the second frame part and spaced behind the protective plastic sheet means in the first frame part, for defining a second confined space with the protective plastic sheet means;

h. substitutable magnetic means, having a preformed shape and being placable within the second confined space, for emanating a magnetic field which forms the plurality of magnetizable means into the image that is defined by the preformed shape; and i. means, mounted on the first frame part and the second frame part, for holding the first frame part and the second frame part together.

* * * * *